(No Model.)

H. C. WILLIAMS.
WIRE UNWINDING DEVICE.

No. 594,977. Patented Dec. 7, 1897.

WITNESSES
C. P. Lukan,
A. Bergmann,

INVENTOR
Harry C. Williams
By D. W. Bradford
Attorneys.

UNITED STATES PATENT OFFICE.

HARRY C. WILLIAMS, OF STOCKBRIDGE, MICHIGAN.

WIRE-UNWINDING DEVICE.

SPECIFICATION forming part of Letters Patent No. 594,977, dated December 7, 1897.

Application filed September 3, 1897. Serial No. 650,453. (No model.)

*To all whom it may concern:*

Be it known that I, HARRY C. WILLIAMS, a citizen of the United States, residing at Stockbridge, in the county of Ingham and State of Michigan, have invented certain new and useful Improvements in Wire-Unwinding Devices; and I do hereby declare the following to be a full, clear, and exact description of the invention, such as will enable others skilled in the art to which it appertains to make and use the same, reference being had to the accompanying drawings, forming a part of this specification.

This invention relates to wire-unwinding devices, and has for its object to provide means whereby barb-wire may be handled on spools or reels and unwound therefrom without slackening the tension of the wire and without injury to the hands of the operator.

The invention consists in the construction and arrangement of the device to be hereinafter described, and particularly pointed out in the claims.

Figure 1:
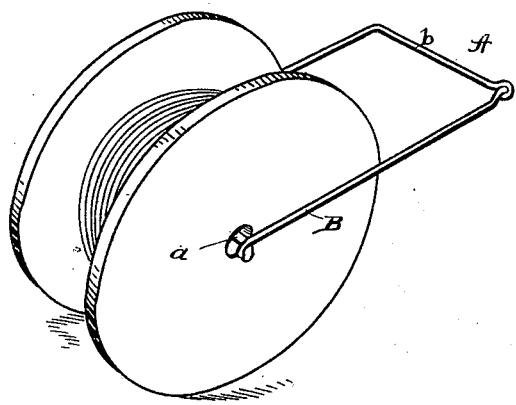
Figure 2:
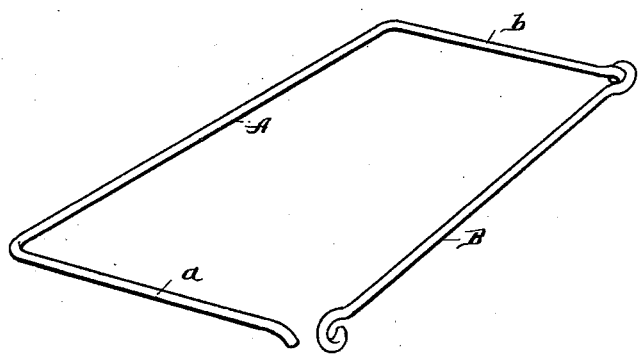

Referring to the accompanying drawings, forming a part of this specification, Figure 1 shows my improved device in connection with a spool of wire as applied thereto for unwinding the same. Fig. 2 illustrates the device separated from the spool.

Like letters of reference refer to corresponding parts.

The class of wire which my invention is particularly adapted to manipulate is that class generally employed for the construction of farm-fences and like structures, and in supplying it to the trade the manufacturer usually puts it up in large spools or reels, which are constructed with a hollow core around which the wire is turned in the form of a large bundle or spool. In unwinding this wire it has been found difficult to handle the reel, whereby it may be moved along the ground without slackening the tension upon the wire and without injury to the operator. For these reasons my invention has been produced, which consists of a bail A, constructed in a U shape, having one end terminated in the form of an eye with which engages one end of a side bar B. The entire structure forms a complete rectangle, one end $a$ forming the axle, which is arranged to pass through the eye of the spool, the other end $b$ forming the handle by which the spool is drawn over the ground to unwind the wire. The free end of the bar B terminates with an eye and is adapted to engage and catch over the end of the portion $a$, which passes through the eye in the spool. This structure enables the parts to be quickly and easily assembled, providing a cheap and durable device.

In the use of my invention, the free end of the reel or spool of wire being secured to a stationary point—as, for example, a post or other like object—the end $a$ of the bail is passed through the eye of the spool and the free end of the bar B engaged over its outer end, whereupon the reel may be drawn over the ground from the handle end $b$, unwinding the wire as it rolls, and as the flanges of the spool are always larger than the body of the coil of wire the spool necessarily travels over the ground somewhat faster than the wire unwinds. Thus as it is drawn along by the operator the weight of the wire, causing a friction upon the ground, tends to keep the wire under tension.

Having thus described my invention, what I claim is—

1. In a wire-unwinding device, a bail in the form of a rectangle, having one side loosely connected at one end and the other adapted to be engaged to complete the rectangle, one end of said rectangle arranged to be inserted in the eye of a spool of wire, and the other adapted to form a handle, substantially as described.

2. As a new article of manufacture, a wire-unwinding device consisting of a U-shaped bail having one end terminated in the form of an eye, a side bar having one end adapted to loosely engage said eye, and the other end arranged to engage the opposite end of said bail, substantially as described.

In testimony whereof I affix my signature in presence of two witnesses.

HARRY C. WILLIAMS.

Witnesses:
WM. B. GILDART,
EMERSON O. GILDART.